Patented Feb. 14, 1933

1,897,410

UNITED STATES PATENT OFFICE

ARTHUR ZITSCHER AND WILHELM SEIDENFADEN, OF OFFENBACH-ON-THE-MAIN, GERMANY, ASSIGNORS TO GENERAL ANILINE WORKS, INC., OF NEW YORK, N. Y., A CORPORATION OF DELAWARE

DIAZO SULFONATES OF THE DIARYLAMINE SERIES

No Drawing. Application filed September 3, 1931, Serial No. 561,087, and in Germany September 4, 1930.

Our present invention relates to new diazo sulfonates of the diarylamine series, more particularly to those corresponding to the probable general formula $$X-NH-R-N=N-SO_3-\text{alkali metal}$$

wherein X means a naphthalene nucleus or a radical of the benzene series which may contain in the para-position to the NH-group a further $-N=N-SO_3-$alkali-metal group and R means a radical of the benzene series.

As substituents of the benzene radicals may be specifically named: alkyl, alkoxy, aryloxy, alkylmercapto, aroylamino, halogen, nitro, arylsulfonyl, arylaminocarbonyl.

These compounds are produced by treating the corresponding diazo or bis-diazo-diarylamine with an alkali metal sulfite in the manner described in Berichte der Deutschen Chemischen Gesellschaft vol. 30 page 71.

They are of a great value for the production of azo-dyestuffs, as described in the copending U. S. application Serial No. 561,088 filed on September 3, 1931 in the name of Arthur Zitscher, Wilhelm Seidenfaden and Karl Jellinck.

In order to further illustrate our invention the following examples are given, the parts being by weight and all temperatures in centigrade degrees. But we wish it to be understood that we are not limited to the particular conditions or specific products mentioned therein.

Example 1

39.8 parts of 4.4'-diamino-diphenylamine are tetrazotized in the customary manner by means of 115 parts of hydrochloric acid of 20° Bé. and 28 parts of sodium nitrite. The tetrazo solution thus formed is introduced at 10–15° into a solution of 56 parts of anhydrous sodium sulfite and 32 parts of calcined sodium carbonate. The brown solution which does not combine any longer with 2-hydroxynaphthalene-3.6-disulfonic acid is mixed with common salt. Thereby the sodium salt of diphenylamine-4.4'-bis-diazosulfonic acid precipitates in the form of small brown crystals. It corresponds to the probable formula

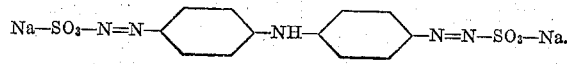

With other diamino-diphenylamines, as, for instance 4.4'-diamino-2-chloro-3.3'-dimethyl-diphenylamine in an analogous manner the corresponding bis-diazo-sulfonates are produced.

Example 2

The neutralized diazo solution prepared in the customary manner by starting from 214 parts of 4-amino-4'-methoxy-diphenylamine is introduced at 15–25° while stirring into a solution of 133 parts of anhydrous sodium sulfite and 1000 parts of water. After stirring for a quarter of an hour 1600 parts of common salt are added and the mass is stirred again for 3 hours. Then the precipitate is filtered and dried. The diazo-sulfonate thus obtained as a yellow powder corresponds to the probable formula

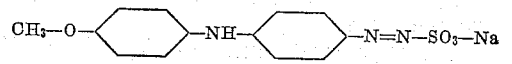

In an analogous manner 4-amino-4'-ethoxy-(or 4'-phenoxy)-diphenylamine is converted into the corresponding diazo-sulfonate.

Example 3

The diazo solution prepared in the customary manner by starting from 21.4 parts of 4-amino-3-methoxy-diphenylamine is introduced at 10–20° into a solution of 20 parts of anhydrous sodium sulfite and 10 parts of anhydrous sodium carbonate in 200 parts of water. After stirring for 6 hours the precipitate is filtered, washed with common salt solution and dried. In this manner the diazo-sulfonate is obtained in the form of an orange-yellow powder. It corresponds to the probable formula

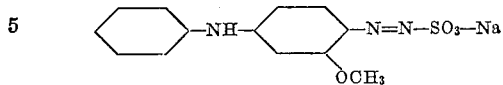

In an analogous manner the corresponding diazo-sulfonates are obtained by starting from other 4-amino-diaryl-amines of the above mentioned kind, as, for instance: 4-amino-3'-chloro-diphenylamine, 4-amino-2'-methyl-diphenylamine, 4-amino-4'-methyl-mercapto-diphenylamine, 4-amino - 4' - benzoylamino-diphenylamine, 4 - amino - 3 - (4'-methyl-benzene-sulfonyl)-diphenylamine, 4-amino - 3' - (phenyl - amino - carbonyl) - diphenylamine, 4 - amino - 4' - nitro - diphenylamine, 4-amino-2.5-dimethoxy-2'.4'-dinitro-diphenylamine, 2-(4'-amino-phenylamino)-naphthalene.

We claim:

1. As new compounds the diazo-sulfonates of the diarylamine series corresponding to the probable general formula:

X—NH—R—N=N—SO$_3$—alkali metal wherein X means a naphthalene nucleus or a radical of the benzene series which may contain in the para-position to the NH-group a further —N=N—SO$_3$—alkali metal group and R means a radical of the benzene series, which compounds represent when dry yellowish to brownish powders and are valuable intermediates for the production of azo dyestuffs.

2. As new compounds the diazo-sulfonates of the diaryl-amine series corresponding to the probable general formula:

wherein the benzene nuclei may contain alkyl, alkoxy, aryloxy halogen or nitro substituents and Y means hydrogen or one of the aforesaid substituents or a second —N=N—SO$_3$—alkali metal group, which compounds represent when dry yellowish to brownish powders and are valuable intermediates for the production of azo dyestuffs.

3. As a new compound the 4'-methoxy-diphenylamine-4-diazo-sulfonate of the probable formula:

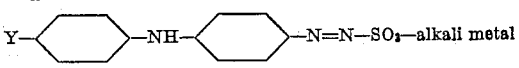

which compound represents when dry a yellow powder and is a valuable intermediate for the production of azo dyestuffs.

4. As a new compound the diphenylamine-4.4'-bis-diazo-sulfonate of the probable formula:

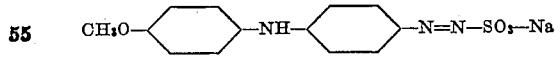

which compound represents small brown crystals and is a valuable intermediate for the production of azo dyestuffs.

5. As a new compound the 2.5-dimethoxy-2'.4'-dinitro-diphenylamine - 4-diazo - sulfonate of the probable formula:

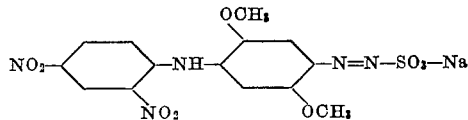

which compound represents a valuable intermediate for the production of azo dyestuffs.

In testimony whereof, we affix our signatures.

ARTHUR ZITSCHER.
WILHELM SEIDENFADEN.